UNITED STATES PATENT OFFICE.

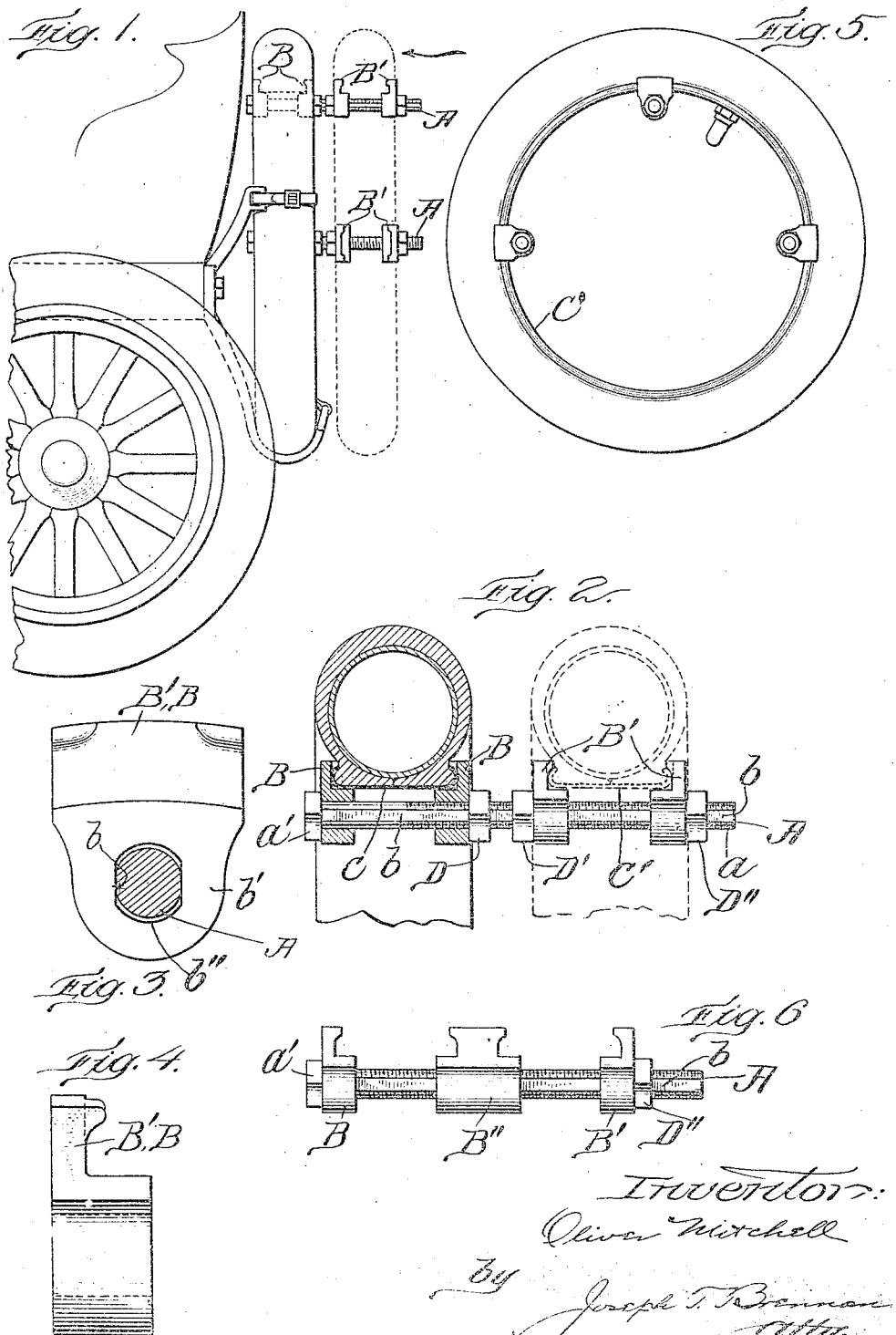

OLIVER MITCHELL, OF BROOKLINE, MASSACHUSETTS.

TIRE-CARRIER.

1,304,696.

Specification of Letters Patent.

Patented May 27, 1919.

Application filed May 31, 1918. Serial No. 237,401.

*To all whom it may concern:*

Be it known that I, OLIVER MITCHELL, a citizen of the United States, residing at Brookline, in the county of Norfolk and State of Massachusetts, have invented certain new and useful Improvements in Tire-Carriers, of which the following is a specification.

My invention relates to improved means for securing and carrying a second spare tire.

In the drawings,

Figure 1 is a side elevation of the rear end portion of an automobile equipped with my tire carriers;

Fig. 2 is an elevation, partly in section of one of my tire carrier members;

Fig. 3 is a front elevation of one of the hook members;

Fig. 4 is a side elevation of the same;

Fig. 5 is a diagrammatic view showing the spacing of these carrier members, looking in the direction of the arrow in Fig. 1; and Fig. 6 shows a modification.

The present invention is applicable to those motor cars which are equipped with means to carry one spare tire, usually at the rear, where this spare tire is mounted upon a ring or rim corresponding to the inner curve of the tire, the rim and tire being secured to and carried upon the automobile. The device is preferably used in sets of three units spaced as indicated in Fig. 5. It will only be necessary to describe one of these units in its preferred form.

In the drawings, A is a bolt, headed at $a'$, and screw threaded throughout the greater part of its length as at $a$. This bolt is angular in cross section, the opposite sides being flattened as at $b$. Mounted upon this bolt are two pairs of hook members, B, B', gripping the ring or rim above and below. The base, $b'$, of this hook member is pierced by an aperture $b''$ of a shape to correspond with the cross-sectional shape of the bolt. Nuts D, D', D'' are mounted upon the bolt as shown. The operation is as follows: The headed end of one bolt B is placed beneath the first spare tire, one of the grip members B being next the head and in contact with the inner side of the rim C and the opposed member B being moved into contact with the other side of rim. The nut D is then screwed up until the two hook members B grasp firmly the rim above and below, so that the bolt A is securely held parallel with the plane of the inner surface of rim. The nut D' is then adjusted to such a position upon the bolt A as will space the second spare tire from touching the first spare tire and the rim of the second spare tire is placed between the two hook members B' and the nut D'' is screwed up, forcing the hook members B' to hook firmly the rim C' of the second spare tire. The angular cross-section of the bolt A in connection with the corresponding shape of the aperture $b''$ prevents the hook members from turning upon the bolt and presents them always in proper position to receive a ring or rim. If desired, the nut D may be made sufficiently long to perform the function of nut D' in addition to its primary function of securing hook members B in adjusted position.

In Fig. 6, I have shown a modified construction in which two of the hook members are joined in one part, B'', and in which only one nut or other securing means is necessary. I prefer, however, the construction shown in the other figures, in which only three different parts are employed, namely a hook member, a bolt and a nut, and in which also, the dismounting of the second spare tire does not disturb the connection of the device with its support.

I claim:

1. In a second spare tire carrier the combination of a rim secured to and carried upon an automobile; a free bolt; a pair of hook members carried by the bolt, and engaging opposite sides of the fixed rim; means to press the hook members against opposite sides of the fixed rim to secure the bolt thereto; a second pair of hook members, adapted to receive a second rim between them; means to secure this second pair of hook members in gripping relation with the second rim.

2. In a second spare tire carrier the combination of a rim secured to and carried upon an automobile; a free, threaded bolt; a pair of hook members carried by the bolt and engaging opposite sides of the fixed rim; a nut engaging the threads upon the bolt to press the hook members against opposite sides of the fixed rim to secure the bolt thereto; a second pair of hook members, adapted to receive a second rim between them; a nut, engaging the threads upon the bolt, to secure this second pair of hook members in gripping relation with the second rim.

3. As a new article of manufacture, a second spare tire carrier, made up of a free bolt; a pair of hook members carried by the bolt and adapted to receive a rim between them; means to hold the hook members in adjusted position upon the bolt, when in use; a second pair of hook members carried by the bolt and adapted to receive a rim between them; means to hold the second pair of hook members in adjusted position upon the bolt, when in use.

Signed at Boston, Mass., this 29th day of May, 1918.

OLIVER MITCHELL.